United States Patent
Morris et al.

(10) Patent No.: US 6,169,740 B1
(45) Date of Patent: Jan. 2, 2001

(54) METHOD OF AND APPARATUS FOR VIRTUAL LINK MANAGEMENT

(75) Inventors: Todd Douglas Morris, Kanata; Norman Allan Lyon, Hull; David Anthony Fisher; Alan Frank Graves, both of Kanata, all of (CA)

(73) Assignee: Nortel Networks Limited, Montreal (CA)

( * ) Notice: Under 35 U.S.C. 154(b), the term of this patent shall be extended for 0 days.

(21) Appl. No.: 08/961,138

(22) Filed: Oct. 30, 1997

(51) Int. Cl.$^7$ .................................................. H04L 12/28
(52) U.S. Cl. ........................ 370/397; 370/231; 370/395
(58) Field of Search .................................... 370/229, 230, 370/231, 232, 238, 395, 397, 412, 235; 709/102, 103, 104

(56) References Cited

U.S. PATENT DOCUMENTS

| 5,581,544 | * | 12/1996 | Hamada et al. | 370/253 |
| 5,748,614 | * | 5/1998 | Wallmeier | 370/235 |
| 5,953,338 | * | 9/1999 | Ma et al. | 370/395 |

FOREIGN PATENT DOCUMENTS

| 0596159A1 | 11/1994 | (EP) . |
| 0798942A2 | 1/1997 | (EP) . |

* cited by examiner

Primary Examiner—Chi H. Pham
Assistant Examiner—Frank Duong
(74) Attorney, Agent, or Firm—Gowling Lafleur Henderson LLP; Yoshi Haru Toyooka

(57) ABSTRACT

Novel traffic management schemes of a telecommunications network using the concept of virtual links is disclosed. As an example, if a switch connects via a high bandwidth link to an access mux that drives lower bandwidth links. The mux is a potential congestion point in the downstream direction (from high to low bandwidth links) because traffic can arrive at a greater rate over the high bandwidth link than it can exit through the lower bandwidth link. If all of the traffic destined for a particular low bandwidth link can be organized into a unique virtual link. This virtual link can be scheduled at a maximum rate not exceeding the bandwidth of the low bandwidth link, thus preventing the mux from ever becoming a congestion point. Therefore, the amount of mux buffering can be reduced to a very small amount (for jitter absorption). One advantage of this scheme in this example is potentially large cost reductions in the high volume access mux at the lesser expense of a more complex low volume switch.

23 Claims, 4 Drawing Sheets

METHOD OF AND APPARATUS FOR VIRTUAL LINK MANAGEMENT

FIELD OF INVENTION

The present invention relates generally to traffic management in a communications network. In particular, it is directed to traffic management by the use of one or more virtual links.

BACKGROUND OF THE INVENTION

Some form of traffic management is always present in any communications networks and the invention can be applied to various traffic management schemes. The description which follows below refers particularly to traffic management in an asynchronous transfer mode (ATM) network. The exact form and features of traffic management in a switch within the network is heavily influenced by how traffic is assigned to queues at any queuing point within the switch.

There are various methods of queue assignment known in the art. Traffic management features are usually arranged around the queuing structure but it affects more than just queuing. For example, scheduling, buffer management, discard thresholds, flow control mechanisms, and billing information may all be affected. It is logical, therefore, to describe how a switch generically organizes its traffic, without restricting the description to queuing.

Two common such organizations known in the art are based on class-based queuing, and per-connection queuing. Class-based queuing consists of the traffic of connections having similar requirements sharing a queue. Assuming an implementation is based on shared memory, admittance into a queue may consider the level of occupancy of the shared memory as well as of the specific queue. This permits preventing a single queue from consuming all of the shared memory resource. The act of determining which queue is to provide the next cell to dequeue is referred to as scheduling. With class-based queuing, scheduling is done by considering the state of each class queue, and the performance requirements of each class.

Per-connection queuing assigns a separate queue to each connection, rather than to a class, and thus makes the features available to all connections. Sometimes, but not necessarily, the concept of the class is retained. This impacts the scheduling and buffer management algorithms by creating an additional level of hierarchy within them. For example, a class-level scheduler can still be employed to determine which class to serve, but it must hand off to a connection-level scheduler that will choose a connection, and hence a queue, from within the indicated class. Admittance into a queue may now consider the occupancy of the shared memory, the class, and the connection queue.

Let us consider a network shown in FIG. 1 in which a switch 10 connects via a high bandwidth link 12 to an access mux/demux 14 (hereinafter called mux for short) that drives lower bandwidth links 16. The mux is a potential congestion point in the downstream direction (from high to low bandwidth links) simply because traffic can arrive at a greater rate over the high bandwidth link than it can exit through the lower bandwidth link. Note that it is assumed that the high bandwidth link is not channelized according to the lower bandwidth links. It is further assumed that there are no other sources of traffic to the lower bandwidth link other than the high bandwidth link (i.e. there is no internal switching from other low bandwidth link upstream traffic, and there is no other high bandwidth link), which is generally the case with simple low-cost muxes. The fact that the mux is a congestion point requires it to provide traffic management features and sufficient buffering that will assure good performance for the diverse requirements of the variety of connections competing for the links. Further, if the mux is terminating a customer link, since cells may be dropped at this point, accounting of delivered traffic must also be done for billing purposes.

Now, referring back to FIG. 1, if the switch driving the high bandwidth link to the mux supports virtual links, then according to one aspect of the invention, all of the traffic destined for a particular low bandwidth link can be organized into a unique virtual link. This virtual link can be scheduled at a maximum rate not exceeding the bandwidth of the low bandwidth link, thus preventing the mux from ever becoming a congestion point. Therefore, the amount of mux buffering can be reduced to a very small amount (for jitter absorption). The advantage of the invention in this example is potentially large cost reductions in the high volume access mux at the lesser expense of a more complex low volume switch. Other benefits can become apparent in the description that follows below.

Recognizing that as described above, there are different organizational views of the total link traffic, the invention defines a virtual link to be an organizational view similar to a typical link view, and allows virtual links to replace connections in the link view, thereby creating one or more additional levels of hierarchy to how traffic is managed.

OBJECTS OF THE INVENTION

It is therefore an object of the invention to provide a method of and apparatus for managing communications traffic which results in simplified equipment downstream.

It is another object of the invention to provide a method of and apparatus for scheduling the traffic on a link so that congestion downstream can be better controlled.

It is yet a further object of the invention to provide a method of and apparatus for traffic management which can be implemented with little modification to functionalities and features which are already present in the network.

SUMMARY OF THE INVENTION

Briefly stated, in accordance with one aspect the invention resides in a communications network in which a link connects node A and one or more downstream destination nodes, having one or more output ports. The invention is directed to a method of managing traffic at node A in which the traffic flows from node A through the link. The method comprises steps of obtaining resource capacity requirements of one or more groups of one or more connections outputted from said one or more output ports of the one or more downstream destination nodes and forming said one or more groups of the connections into one or more virtual links. The method further includes steps of identifying the groups of the connections by virtual link identifiers and managing the traffic in the one or more virtual links by performing thereto at node A, one or more of the following algorithms, connection admission control algorithm, buffer management algorithm, flow control algorithm and scheduling algorithm so that said resource capacity requirements are satisfied.

In accordance with a further aspect, the invention is directed to an apparatus for managing traffic in a link of a communications network in which the link connects node A and one or more downstream destination nodes, said one or more downstream destination node having one or more output ports. The apparatus comprises a control signal receiver for obtaining resource capacity requirements of one or more groups of one or more connections outputted from said one or more output ports of the one or more downstream destination node. The apparatus further includes a traffic handler for forming the groups of the connections into one or more virtual links, and for identifying the groups of the connections by virtual link identifiers and a traffic controller having one or more of the following algorithms, connection admission control algorithm, buffer management algorithm, flow control algorithm and scheduling algorithm and for performing to said one or more virtual links said one or more algorithm concurrently or separately so that said resource capacity requirements are satisfied.

DETAILED DESCRIPTION OF PREFERRED EMBODIMENTS OF THE INVENTION

Figure 2:
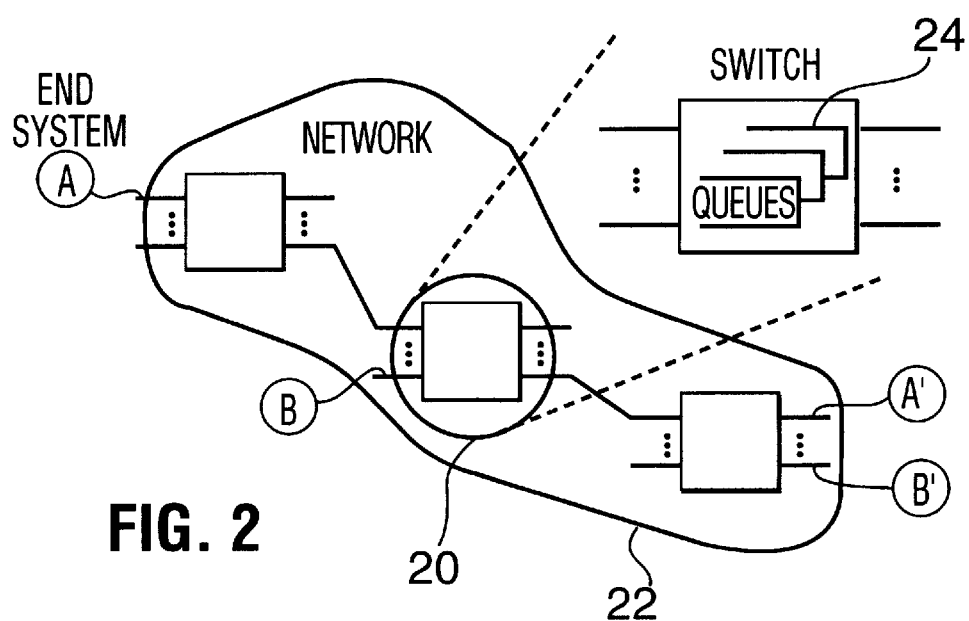
FIG. 2 shows schematically a network arrangement applicable to the invention.

The invention is applicable to any switch, mux/demux or router that carries data through a congestable resource. These resources are usually deployed in a network and form nodes of the network. In this specification, these congestable resources are therefore collectively called nodes. FIG. 2 shows a high level view of one such network. In the figure, three switches 20 are shown as part of a network 22. End systems connect to the network, and are the source and sink of network traffic. In the figure, end system A has established a connection to end system A', as has end system B to system B'. The connections are typically bidirectional, and the invention is applicable in both directions, although for simplicity, unidirectional connections are shown and are implied by the orientation of the queues 24 shown in the expanded view of the switch within the figure. The mapping of traffic to queues is arbitrary; a queue may correspond to a single connection, a group of connections, or even all connections, for example. The switch need not be of any particular architecture and, for example, it may be input-buffered, output-buffered, or hybrid.

Figure 3:
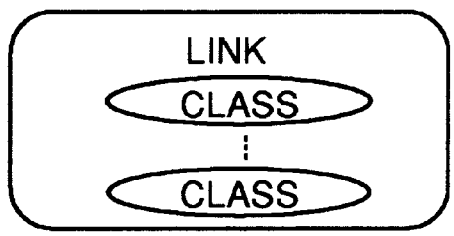
FIG. 3 is a per-class organizational view of a known link structure.

FIG. 3 shows a known per-class organizational view of a link traffic. Since a whole switch typically has at least some knowledge of the individual connections it is carrying, this view is somewhat restrictive. This view may apply, however, to some subset of the switch or its functionality, such as queuing for example.

Figure 4:
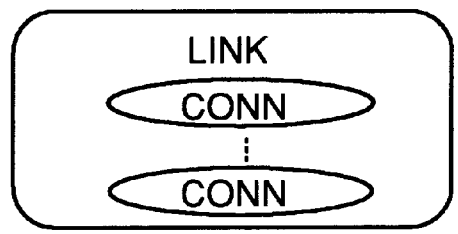
FIG. 4 is a per-connection organizational view of a known link structure.
Figure 5:
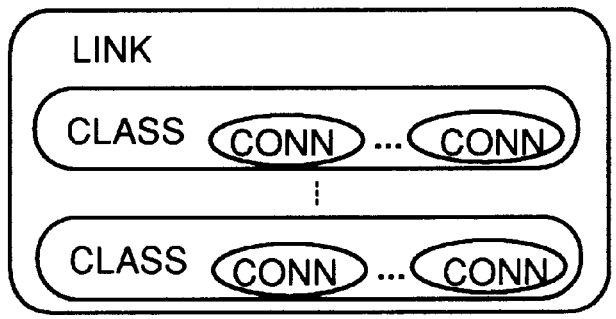
FIG. 5 is per-connection organizational view of a known link structure in which a class level is retained.

FIGS. 4 and 5 show known per-connection organizational views of a link traffic in which FIG. 5 shows where the class level is retained. In this case each class contains one or more connections.

Figure 6:
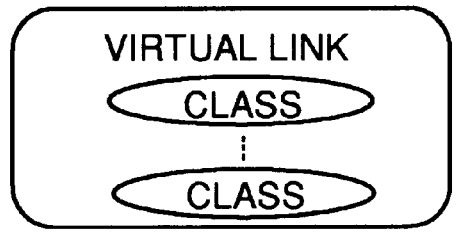
FIGS. 6, 7 and 8 are organizational views of a virtual link structure according to various embodiments of the invention but are analogous to those shown in FIGS. 3, 4 and 5.
Figure 7:
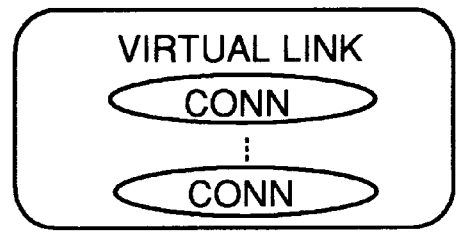
Figure 8:
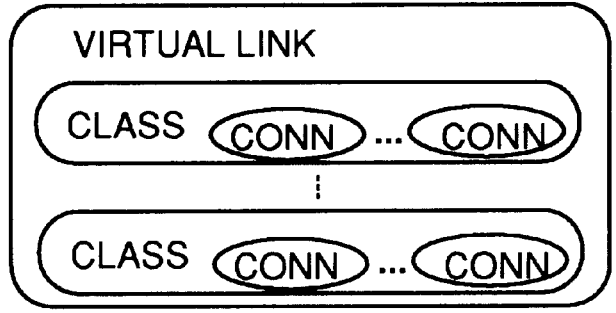

According to one embodiment of the invention, a virtual link is created as shown in FIGS. 6, 7 and 8 within a link similar to those known link organizations of FIGS. 3, 4 and 5. The simplest virtual link would be class based with a single class. This is close to being a VP (Virtual Path) connection, but without the restriction of all constituent connections sharing the same VPI (Virtual Path Identifier). To support virtual links in a network, the known link organization is modified by allowing virtual links to appear. In one embodiment, they would typically appear at the lowest level of the link organization, although they need not be restricted there. Thus, they may appear in place of a class in a per-class organization, or more likely, in place of a connection in a per-connection organization.

Figure 9:
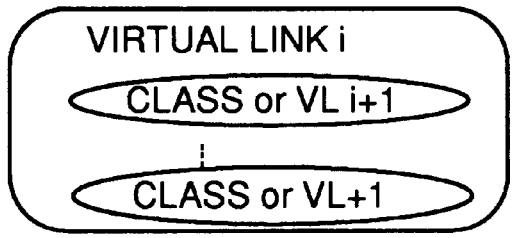
FIGS. 9, 10 and 11 are organizational views of a nested virtual link structure according to yet further embodiments of the invention.
Figure 10:
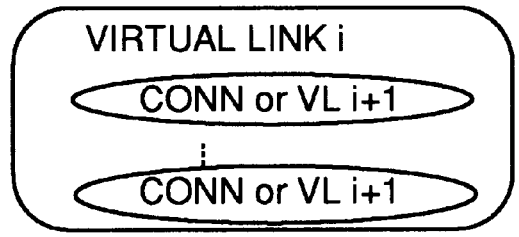
Figure 11:
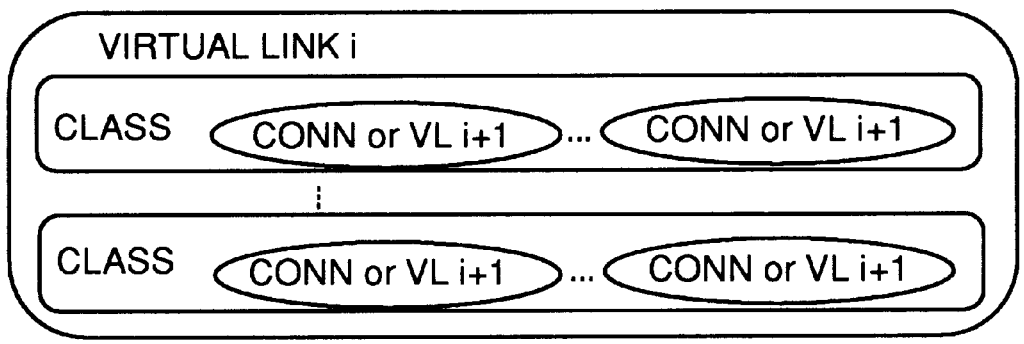

Furthermore, the organization of the virtual link is enhanced to allow the inclusion of nested virtual links, in place of some of its classes or connections. Therefore like earlier views discussed above, the complete organizations of a virtual link are represented as shown in FIGS. 9, 10 and 11. The Figures use the letter "i" to indicate the nesting level of a virtual link and the virtual links contained within are at level i+1. Note that this is only truly recursive if the organization of a virtual link is the same at all levels, but the definition is more general, and allows unique organizations (per-class or per-connection) at each level. It is of course possible for a link to carry two or more virtual links, some of which may be nested virtual links. They can also be destined for different downstream destination nodes.

This new organizational view of link traffic will impact on scheduling, buffer management, flow control, and CAC (connection admission control) of the network and the following description discusses these topics in detail.

Figure 12:
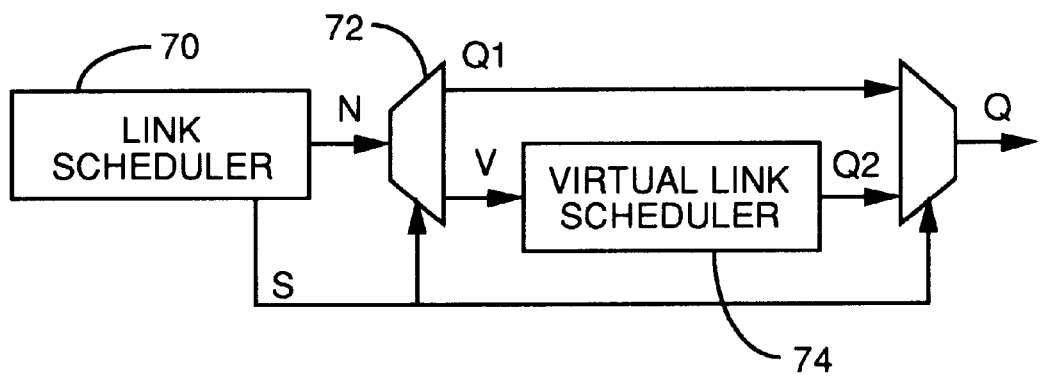
FIG. 12 is a schematic illustration of a scheduler arrangement which support virtual links according to the invention.

FIG. 12 shows a link scheduler according to one preferred embodiment of the invention which supports virtual link scheduling. The known link scheduler normally produces a queue identifier but in FIG. 12, the link scheduler 70 handles both queues and virtual links, so its result is no longer necessarily a queue only, but includes a virtual link identifier. This is referred to generically as N in the figure. An output S of the link scheduler 70 is also shown that indicates whether N is to be interpreted as a queue or a virtual link at a selector 72. If queues and virtual links share a common context space, then S could equivalently be determined by examining the appropriate context entry. If the result is already a queue identifier, it is steered to Q via Q1. If the result is instead a virtual link, it is steered via V to a virtual link scheduler 74, which is activated to complete the translation to a queue identifier (Q2 steered to Q).

Figure 13:
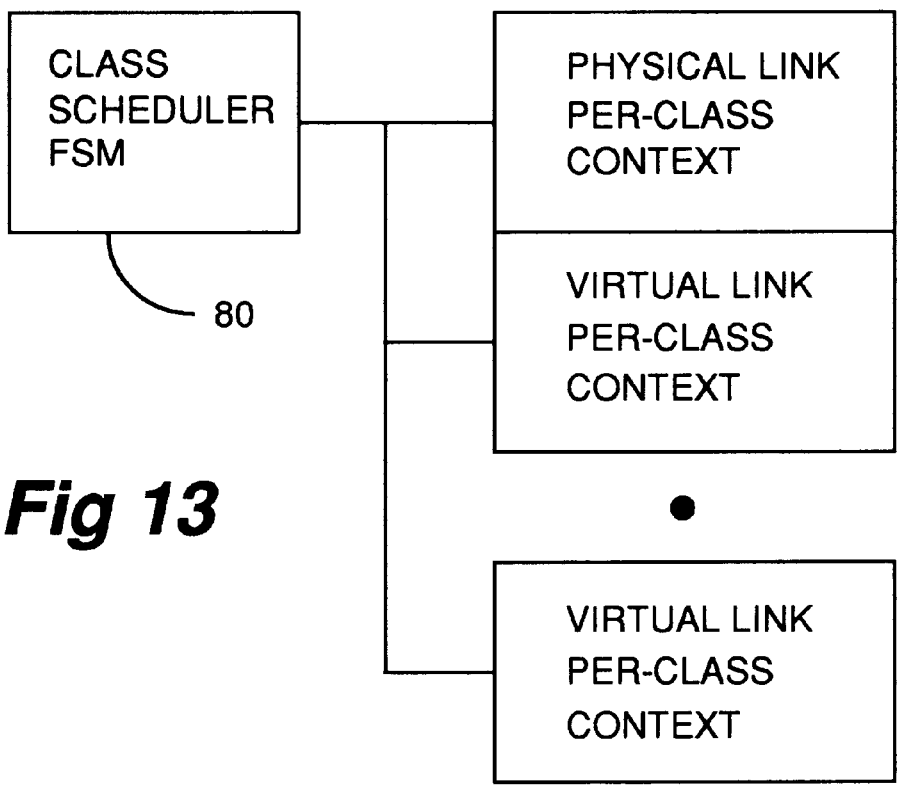
FIG. 13 is a schematic illustration of a virtual private network according to yet another embodiment of the invention.

The fact that the translation from virtual link to queue can be done by a scheduler separate from the original link scheduler means of course that the virtual link organization does not have to exactly mimic the link organization. If it does, however, some implementations may derive economies of re-use by employing certain scheduler sub-blocks in both the physical link and virtual link contexts. For example, referring to FIG. 13, suppose that the link supports class-level scheduling with a state machine 80 that operates on the classes' state information which is stored in a memory. Then virtual link class-level scheduling could support the same algorithm as the link by storing the virtual link class state information in memory, and then directing the state machine to the appropriate memory entry when virtual link class scheduling must be done. Thus, in effect, the state machine is multiplexed between serving the link, and serving one or more virtual links.

The fact that the virtual link scheduler's operation is cascaded with the link scheduler's may increase the worst-case time to produce a result queue. Faced with fixed constraints on this time (associated with the link's cell period), some implementations may choose to alter the virtual link organization relative to the physical link, simplifying wherever possible. For example, it may be considered required in an application to support per-connection queuing for the link, while being acceptable to support only per-class queuing within virtual links. This reduces the time required to schedule virtual links by eliminating a layer of hierarchy (virtual link connections) while also simplifying the virtual link scheduler by limiting it to a small fixed number of classes instead of dealing with a large number of connections (without class organization).

Overall, the specific choice of link and virtual link traffic organizations is a design choice driven by implementation constraints. The virtual link concept is general enough to cover a variety of such options.

Whereas scheduling must be modified in some way to support virtual links, buffer management need not, but additional value can be created by doing so. Buffer management algorithms typically impose constraints on the consumption of buffers for various elements in the link organization of traffic. This is usually controlled with several parameters, which may include discard thresholds, such as for CLP (Cell Loss Priority) values of 0 and 1, and for EPD (Early Packet Discard). It may also provide for the reservation of some buffers for those elements. According to another embodiment, extending these features to include the elements within a virtual link would be useful, depending on the application. For example, if the traffic of a virtual link belongs to a single user, then providing buffer management features for the virtual link can improve fairness amongst users when there are several virtual links competing for resources by preventing a small subset of virtual links from unfairly consuming all of the buffers. Furthermore, buffer management features on the classes and connections (if present) within the virtual link organization are very useful in maintaining the negotiated quality of service for each connection and providing fairness amongst the classes and connections.

As yet a further embodiment, flow control mechanisms (algorithms) implemented on the switch can also be extended to virtual links, the details and utility therewith being dependent on the specific scheme. For example, it may be desirable to support ABR connections within a virtual link. It may be similarly desirable to support RED (Random Early Detection) within a virtual link. It may also be desirable to implement flow control on the virtual link itself, and not just within it. The difference between this and having flow control on the constituent connections is that this approach lets the virtual link scheduler decide how to best divide the bandwidth available to the virtual link, and does not require all constituent connections to be compatible with the flow control scheme.

According to another embodiment, the connection admission control (CAC) algorithms can also be modified to support virtual links, thus alleviating the mux of having to perform CAC. CAC is made multi-level, so that in addition to considering whether a connection will "fit" in the physical link, it considers whether or not the connection will "fit" within the virtual link, and, (if applicable) any nested virtual links.

Figure 1:
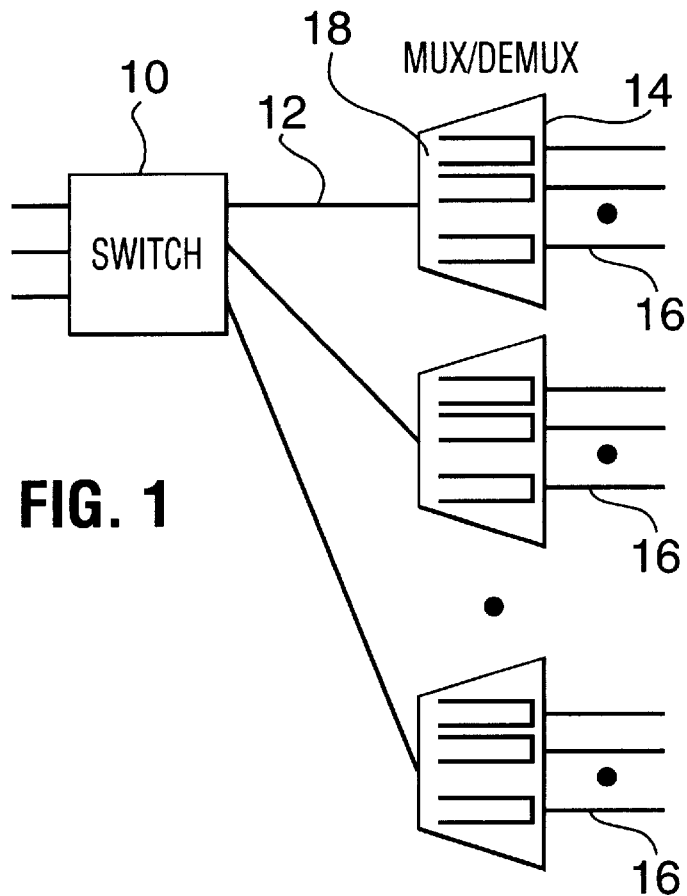
FIG. 1 is a schematic illustration of network components relevant to the present invention.

Referring back to FIG. 1 which shows an application of a virtual link switch. As described earlier, in the figure demux 14 connects access links 16 to the switch 10 via a host link 12. Data flows in both directions, but emphasis is placed here on the downstream direction, from switch to demux, as shown by the arrows. In this direction, data is buffered at a buffer 18, to absorb any jitter and burstiness in the data, which is possible due to the fact that the bandwidth of the host link 12 is greater than that of the access link 16. Without virtual links, there is a need for the buffer 18 to be relatively large, especially if the bandwidth of the host link is much greater than that of the access link. There may also be a need for a per-class, or possibly per-connection, organization to the buffering at the demux 14 in order to offer good capacity while maintaining committed qualities of service. This more complex organization impacts buffer management, possibly creating more thresholds to implement, as well as the scheduler, which must work with a larger number of queues. In short, the demands of good performance bring in many traffic management requirements for the demux because this is a congestion point.

Billing must also be done at this point because cells may be lost. Billing may require no changes if the switch already supports per-connection billing data collection, since the charges for the virtual link traffic can be derived from the connection level data.

According to another embodiment of the invention, the switch supports virtual links, and contains a scheduler which supports rate shaping of virtual links. The traffic destined for each access link therefore can be organized into a separate virtual link, and each virtual link shaped to a maximum rate not exceeding the access bandwidth of the access link. This dramatically reduces the buffer requirements at the demux to a small amount sufficient to absorb the cell jitter caused by the switch's scheduler. This jitter can even be reduced to zero by shaping in such a way as to never allow the instantaneous bandwidth to exceed that of the access link. This small amount of buffer never gets congested, so complex organizations are not needed and a single queue will suffice. This simplifies buffer management greatly, and eliminates the scheduler for each access link. It also means that no data is ever lost, so billing data from the switch can be used. Overall, the demultiplexer can be significantly simplified and cost-reduced.

Certain properties of the switch's rate shaping of virtual links can extend the performance and utility of this application to various mux arrangements. For example, some muxes may support more access bandwidth than host bandwidth. Specifying a fixed rate equal to the bandwidth of the access link for each virtual link leads to a scheduler situation sometimes referred to as overbooking, since not all virtual links can be concurrently served at these rates since it exceeds the host link bandwidth. Therefore, to support this mux arrangement requires a scheduling algorithm that can support overbooking. Note that simple frame-based rate allocation schemes do not do this. It is possible to devise a rate shaper based on calendar queuing techniques that supports overbooking.

In addition to supporting overbooking, it is desirable that the scheduler exhibit reasonable fairness characteristics during episodes of overbooking. In other words, that the competing virtual links receive bandwidths that are reduced in a uniform, or engineered fashion. A uniform fashion means backlogged virtual links of equal maximum rates receive equal bandwidths. An engineered fashion allows these rates to be skewed based on some programmable definition of the relative priority of the competing virtual links. After all, the switch owner may have negotiated higher tariffs for the owners of some virtual links, and wishes to treat them preferentially. An example of an unfair implementation would be one in which one or more backlogged virtual links received substantially more bandwidth than others of equal maximum rates based on some inconsequential detail such as their virtual link identifier number, or the order in which they became backlogged.

If the switch supported nested virtual links, then additional demultiplexers that are downstream from the one already shown could also be accounted for in the switch's link organization, and hence be similarly cost-reduced.

Figure 14:
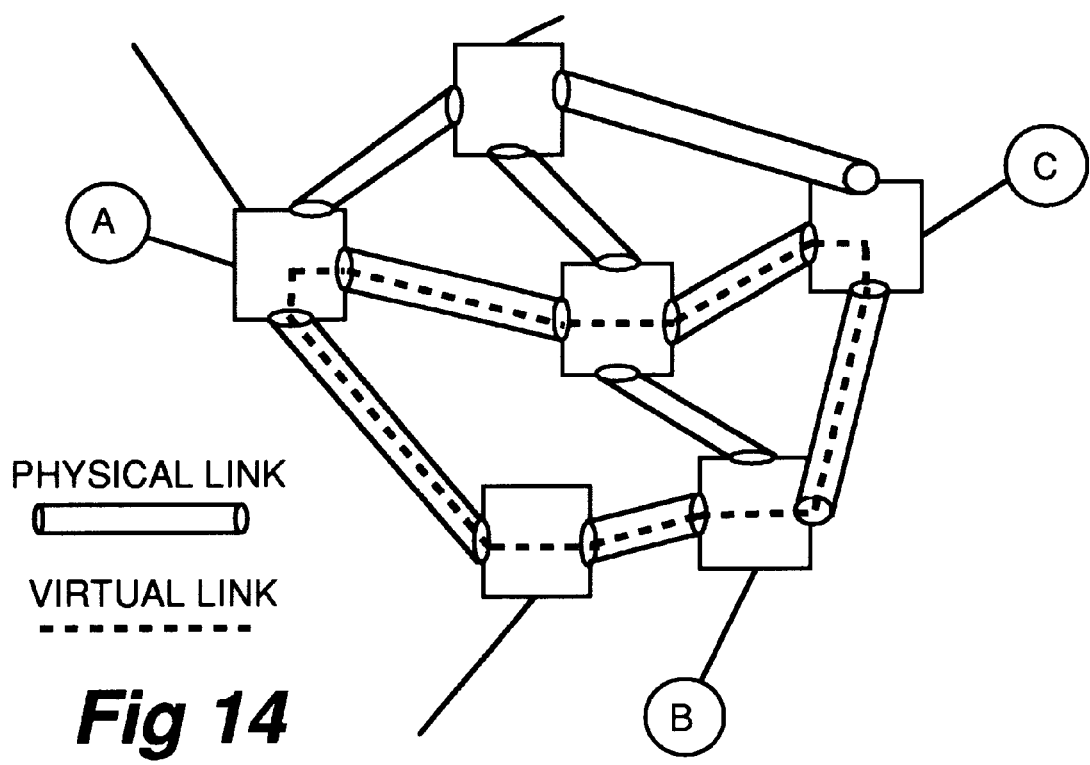
FIG. 14 shows the reuse of a certain scheduler sub-blocks in physical link and virtual link contexts.

Another application of virtual links, known as Virtual Private Networks, is shown in FIG. 14. This embodiment allows the owner of a network to configure a smaller virtual network within it for a customer that may want to connect several of his sites, say A, B, and C, for example. Traffic among these sites is organized into virtual links, shown as a solid line in the figure, and routed over selected physical links which are shown as pipes.

This is somewhat like using channelized links within the network, but is much more flexible, has finer bandwidth granularity, permits the network owner to overbook, and allows other services to use unused virtual link bandwidth. Using virtual links for this application is better than using simple VP connections because of the support for multiple qualities of service that virtual links can offer. From the customer's perspective, his network has the look and feel of a fixed bandwidth network, which he may prefer.

What we claim is:

1. In a communications network in which a link connects node A and a downstream destination node, said downstream destination node having one or more output ports, a method of managing traffic at node A, the traffic flowing from node A through the link, comprising steps of:

obtaining resource capacity requirements of one or more groups of one or more connections outputted from said one or more output ports of said one or more downstream destination nodes;

forming said one or more groups of the connections into one or more virtual links;

identifying the groups of the connections by virtual link identifiers; and managing the traffic in the one or more virtual links by performing thereto at node A, one or more of the following algorithms, connection admission control algorithm, buffer management algorithm, flow control algorithm and scheduling algorithm so that said resource capacity requirements are satisfied.

2. The method according to claim 1, wherein the step of forming is being performed by forming the groups of the connections into more than one virtual links, one or more virtual links being nested in another virtual link.

3. The method according to claim 1, further comprising steps of:

monitoring buffer management parameters with respect to one or more of the virtual links identified by the virtual link identifiers; and performing the buffer management algorithm on one or more of the virtual links according to the monitored buffer management parameters.

4. The method according to claim 2, further comprising steps of:

monitoring buffer management parameters with respect to one or more of the virtual links identified by the virtual link identifiers, including one or more nested virtual links; and performing the buffer management algorithm on one or more of the virtual links and/or nested virtual links according to the monitored buffer management parameters.

5. The method according to claim 1, further comprising steps of:

monitoring flow control parameters with respect to one or more of the virtual links identified by the virtual link identifiers; and performing the flow control algorithm on one or more of the virtual links according to the monitored flow control parameters.

6. The method according to claim 2, further comprising steps of:

monitoring flow control parameters with respect to one or more of the virtual links identified by the virtual link identifiers, including one or more nested virtual links; and performing the flow control algorithm on one or more of the virtual links and/or nested virtual links according to the monitored flow control parameters.

7. The method according to claim 5, further comprising steps of:

monitoring flow control parameters with respect to one or more connections grouped within the virtual links so identified; and performing the flow control algorithm on the connections according to their monitored flow control parameters.

8. The method according to claim 6, further comprising steps of:

monitoring flow control parameters with respect to one or more connections grouped within the virtual links so identified; and performing the flow control algorithm on the connections according to their monitored flow control parameters.

9. The method according to claim 1, further comprising steps of:

monitoring flow control parameters with respect to connections grouped within one or more of the virtual links identified by the virtual link identifiers; and performing the flow control algorithm on the connections according to the monitored flow control parameters.

10. The method according to claim 2, further comprising steps of:

monitoring flow control parameters with respect to connections grouped within one or more of the virtual links identified by the virtual link identifiers, including one or more nested virtual links; and performing the flow control algorithm on the connections according to the monitored flow control parameters.

11. The method according to claim 1, further comprising steps of;

determining connection admission control parameters with respect to a requested connection and one or more of the virtual links identified by the virtual link identifier;

grouping the requested connections to the one or more virtual links; and performing connection admission control algorithms on the one or more virtual links according to the determined connection admission control parameters.

12. The method according to claim 2, further comprising steps of:

determining connection admission control parameters with respect to a requested connection and one or more of the virtual links identified by the virtual link identifiers, including one or more nested virtual links; and performing connection admission control algorithms on one or more of the virtual links and/or nested virtual links according to the determined connection admission control parameters.

13. The method according to claim 11, further comprising a step of:

performing connection admission control algorithm on the link according to the determined connection admission control parameters.

14. The method according to claim 12, further comprising a step of:

performing connection admission control algorithm on the link according to the determined connection admission control parameters.

15. The method according to claim 1, further comprising steps of:

monitoring scheduling parameters with respect to one or more of the virtual links identified by the virtual link identifiers;

performing the scheduling algorithm on one or more of the virtual links according to the monitored scheduling parameters; and sending to said one or more downstream destination nodes the traffic contained in the virtual links at rates that satisfy said resource capacity requirements.

16. The method according to claim 2, further comprising steps of:

monitoring scheduling parameters with respect to a requested connection and one or more of the virtual links identified by the virtual link identifiers, including one or more nested virtual links;

performing the scheduling algorithm on one or more of the virtual links and/or nested virtual links according to the scheduling parameters; and sending to said one or more downstream destination nodes the traffic contained in the virtual links at rates that satisfy said resource capacity requirements.

17. The method according to claim 15, further comprising a step of:

performing scheduling algorithm on the link according to the determined scheduling parameters.

18. The method according to claim 16, further comprising a step of:

performing scheduling algorithm on the link according to the determined scheduling parameters.

19. An apparatus for managing traffic in a link of a communications network in which the link connects node A and one or more downstream destination nodes, said one or more downstream destination nodes having one or more output ports, comprising:

a control signal receiver for obtaining resource capacity requirements of one or more groups of one or more connections outputted from said one or more output ports of said one or more downstream destination nodes;

traffic handler for forming the groups of the connections into one or more virtual links, and for identifying the groups of the connections by virtual link identifiers; and a traffic controller having one or more of the following algorithms, connection admission control algorithm, buffer management algorithm, flow control algorithm and scheduling algorithm and for performing to said one or more virtual links said one or more algorithm concurrently or separately so that said resource capacity requirements are satisfied.

20. The apparatus for managing traffic in a communications network according to claim 19 wherein the traffic controller comprises a link scheduler function state machine which includes a physical link scheduler function state machine for performing a scheduling algorithm on the traffic on the link and one or more virtual link scheduler function state machines for performing respective scheduling algorithms to respective one or more groups of virtual link connections.

21. The apparatus for managing traffic in a communications network according to claim 20 wherein the traffic controller further comprises a selector for selecting queue indications for virtual link connections from the traffic on the link.

22. The apparatus for managing traffic in a communications network according to claim 21 wherein the selector comprises a mux and a demux.

23. The apparatus for managing traffic in a communications network according to claim 22 wherein the traffic controller further comprises a memory device for storing state information of either the physical link scheduler function state machine or the virtual link scheduler function state machine so that a portion of one scheduler function state machine can be reused for performance of the other scheduler function state machine.

* * * * *